United States Patent
Pan et al.

(10) Patent No.: US 10,353,245 B2
(45) Date of Patent: Jul. 16, 2019

(54) TUNABLE TERAHERTZ ACHROMATIC WAVE PLATE AND A TERAHERTZ ACHROMATIC RANGE TUNING METHOD

(71) Applicant: National Tsing Hua University, Hsinchu (TW)

(72) Inventors: Ci-Ling Pan, Hsinchu (TW); Chan-Shan Yang, Taipei (TW); Ru-Pin Pan, Hsinchu (TW); Cho-Fan Hsieh, Yilan County (TW); Fang-Cih Shih, Taipei (TW)

(73) Assignee: National Tsing Hua University, Hsinchu (TW)

( * ) Notice: Subject to any disclaimer, the term of this patent is extended or adjusted under 35 U.S.C. 154(b) by 40 days.

(21) Appl. No.: 15/240,848

(22) Filed: Aug. 18, 2016

(65) Prior Publication Data

US 2018/0017822 A1 Jan. 18, 2018

(30) Foreign Application Priority Data

Jul. 13, 2016 (TW) .............................. 105122124 A (51) Int. Cl.
| | |
|---|---|
| G02F 1/13363 | (2006.01) |
| G02F 1/1337 | (2006.01) |
| G02F 1/1339 | (2006.01) |
| H01P 1/18 | (2006.01) |
| G02F 1/1347 | (2006.01) |
| G02F 1/1333 | (2006.01) |

(52) U.S. Cl.
CPC ...... *G02F 1/13363* (2013.01); *G02F 1/13394* (2013.01); *G02F 1/13471* (2013.01);
(Continued)

(58) Field of Classification Search
CPC .......... G02F 1/13363; G02F 1/133636; G02F 2001/133638
(Continued)

(56) References Cited

U.S. PATENT DOCUMENTS

| | | |
|---|---|---|
| 4,772,104 A | 9/1988 | Buhrer |
| 4,961,634 A | 10/1990 | Chipman et al. |

(Continued)

OTHER PUBLICATIONS

Shih et al., Abstract of "Electrically Tunable Terahertz Achromatic Quarter Waveplate," Annual Meeting of the Physical Society of the Republic of China, Jan. 25-27, 2016, pp. 1.
(Continued)

*Primary Examiner* — Christopher M Raabe
(74) *Attorney, Agent, or Firm* — J.C. Patents (57) ABSTRACT

A tunable terahertz achromatic wave plate including at least three phase retarders and a tuning device is provided. The at least three phase retarders are sequentially arranged along a first direction, and configured to provide an achromatic range in a terahertz band, so as to reduce a chromatic aberration of a terahertz wave through the tunable terahertz achromatic wave plate in the achromatic range. The at least three phase retarders respectively include a liquid crystal cell. The tuning device is configured to tune a liquid crystal orientation angle of the liquid crystal cell, so as to correspondingly change a birefringence of the at least three phase retarders in the terahertz band. The terahertz wave through the tunable terahertz achromatic wave plate has same phase retardation in the achromatic range. The achromatic range in the terahertz band is determined according to the birefringence of the at least three phase retarders.

8 Claims, 4 Drawing Sheets

(52) U.S. Cl.
CPC .......... *G02F 1/133719* (2013.01); *H01P 1/18* (2013.01); *H01P 1/182* (2013.01); *G02F 2001/133302* (2013.01); *G02F 2001/133638* (2013.01); *G02F 2001/133738* (2013.01); *G02F 2001/133742* (2013.01); *G02F 2203/13* (2013.01); *G02F 2203/50* (2013.01); *G02F 2413/03* (2013.01)

(58) Field of Classification Search
USPC .......................................................... 349/18
See application file for complete search history.

(56) References Cited

U.S. PATENT DOCUMENTS

| | | | | |
|---|---|---|---|---|
| 5,592,314 | A * | 1/1997 | Ogasawara | G02F 1/13473 349/114 |
| 6,141,069 | A * | 10/2000 | Sharp | G02B 5/3016 349/18 |
| 6,614,572 | B2 * | 9/2003 | Kelly | G02F 1/0136 349/1 |
| 6,788,462 | B2 | 9/2004 | Lesniak | |
| 2008/0247026 | A1 | 10/2008 | Smith | |
| 2011/0026026 | A1 | 2/2011 | Jez et al. | |
| 2016/0048049 | A1 | 2/2016 | Abdulhalim et al. | |

OTHER PUBLICATIONS

"Office Action of Taiwan Counterpart Application," dated Apr. 6, 2017, p. 1-p. 7.

\* cited by examiner

| disposing at least three phase retarders along a first direction sequentially to provide an achromatic range in a terahertz band, so as to reduce a chromatic aberration of a terahertz wave through the at least three phase retarders in the achromatic range, wherein the at least three phase retarders respectively comprise a liquid crystal cell | ~S810 |

| tuning a liquid crystal orientation angle of the liquid crystal cell, so as to correspondingly change each birefringence of the at least three phase retarders in the terahertz band, so that the terahertz wave through the at least three phase retarders has a same phase retardation in the achromatic range, and the achromatic range in the terahertz band is determined according to each the birefringence of the at least three phase retarders | ~S820 |

FIG. 8

TUNABLE TERAHERTZ ACHROMATIC
WAVE PLATE AND A TERAHERTZ
ACHROMATIC RANGE TUNING METHOD

CROSS-REFERENCE TO RELATED
APPLICATION

This application claims the priority benefit of Taiwan application serial no. 105122124, filed on Jul. 13, 2016. The entirety of the above-mentioned patent application is hereby incorporated by reference herein and made a part of this specification.

BACKGROUND OF THE INVENTION

Field of the Invention

The invention relates to an achromatic wave plate, and particularly relates to a tunable terahertz achromatic wave plate and a terahertz achromatic range tuning method.

Description of Related Art

In recent years, there are more and more research in a terahertz wave in the related technical field, such as applications in detection, terahertz wave image, and medical treatment. Especially, the related application and research in photoelectrical micrometer wave real-time image radar is an important development direction recently. Also, since the application level becomes wider, the need of various optical elements applicable to the terahertz wave is increasing. However, in the prior art, the technical mean for achromatic effects by using a traditional lens to form a phase retarder is usually applied to a frequency band range of visible light, and it can not provide modulation effects. Thus, how to design an achromatic wave plate which can be applied to the terahertz frequency band and can provide the modulation effect to meet the needs of use simultaneously is an important issue recently.

SUMMARY OF THE INVENTION

The invention provides a tunable terahertz achromatic wave plate and a terahertz achromatic range tuning method, which can provide an achromatic aberration in a terahertz frequency band and tune an achromatic range.

The invention provides a tunable terahertz achromatic wave plate including at least three phase retarders and a tuning device. The at least three phase retarders are arranged along a first direction sequentially. The at least three phase retarders are configured to provide an achromatic range in a terahertz band, so as to reduce a chromatic aberration of a terahertz wave through the tunable terahertz achromatic wave plate in the achromatic range. The at least three phase retarders respectively include a liquid crystal cell. The tuning device is configured to tune a liquid crystal orientation angle of the liquid crystal cell, so as to correspondingly change each birefringence of the at least three phase retarders in the terahertz band. The terahertz wave through the tunable terahertz achromatic wave plate has the same phase retardation in the achromatic range, and the achromatic range in the terahertz band is determined according to each the birefringence of the at least three phase retarders.

According to an embodiment of the invention, the phase retardation is ¼ wavelength. The at least three phase retarders include one half-wave plate and two ⅓ wave plates.

According to an embodiment of the invention, the at least three phase retarders include a first phase retarder, a second phase retarder, and a third phase retarder. The first phase retarder, the second phase retarder, and the third phase retarder are a ⅓ wave plate, a half-wave plate, and a ⅓ wave plate sequentially.

According to an embodiment of the invention, the liquid crystal cell includes two quartz glass substrates. A thickness of the liquid crystal cell is determined according to a size of a spacer between the two quartz glass substrates. The two quartz glass substrates further include a nematic liquid crystal therebetween. Each phase difference of the at least three phase retarders is determined according to the thickness of each the liquid crystal cell.

According to an embodiment of the invention, the liquid crystal cell is a liquid crystal cell having vertical alignment. The tuning device respectively controls a liquid crystal orientation angle of the at least three phase retarders through a magnetic element disposed around the liquid crystal cell by a magnetic field control mode.

According to an embodiment of the invention, the two quartz glass substrates are respectively plated with silane thin films for vertical alignment.

According to an embodiment of the invention, the at least three phase retarders include a first phase retarder, a second phase retarder, and a third phase retarder. Thicknesses of the first phase retarder, the second phase retarder, and the third phase retarder are 3.86 micrometers, 2.56 micrometers, and 3.86 micrometers sequentially.

According to an embodiment of the invention, the liquid crystal cell is a liquid crystal cell having parallel alignment. The tuning device respectively controls a liquid crystal orientation angle of the at least three phase retarders through two conductive layers disposed at the two quartz glass substrates by an electric field control mode.

According to an embodiment of the invention, the two quartz glass substrates are respectively plated with indium tin oxide thin films for parallel alignment.

According to an embodiment of the invention, each thickness of the at least three phase retarders is 0.8 micrometers, 1 micrometer, and 0.8 micrometers sequentially.

The invention provides a terahertz achromatic range tuning method including the following steps. At least three phase retarders are disposed along a first direction sequentially to provide an achromatic range in a terahertz band, so as to reduce a chromatic aberration of a terahertz wave through the at least three phase retarders in the achromatic range. The at least three phase retarders respectively include a liquid crystal cell. A liquid crystal orientation angle of the liquid crystal cell is tuned, so as to correspondingly change each birefringence of the at least three phase retarders in the terahertz band, such that the terahertz wave through the at least three phase retarders has the same phase retardation in the achromatic range. The achromatic range in the terahertz band is determined according to each the birefringence of the at least three phase retarders.

According to an embodiment of the invention, the phase retardation is ¼ wavelength. The step of disposing the at least three phase retarders along the first direction includes that, a first phase retarder, a second phase retarder, and a third phase retarder are disposed sequentially. The first phase retarder, the second phase retarder, and the third phase retarder are a ⅓ wave plate, a half-wave plate, and a ⅓ wave plate sequentially.

According to an embodiment of the invention, the liquid crystal cell is a liquid crystal cell having vertical alignment. The liquid crystal cell includes two quartz glass substrates.

The step of tuning the liquid crystal orientation angle of the liquid crystal cell includes that, a liquid crystal orientation angle of the at least three phase retarders is respectively controlled through a magnetic element disposed around the liquid crystal cell by a magnetic field control mode.

According to an embodiment of the invention, the liquid crystal cell is a liquid crystal cell having parallel alignment. The liquid crystal cell includes two quartz glass substrates. The step of tuning the liquid crystal orientation angle of the liquid crystal cell includes that, a liquid crystal orientation angle of the at least three phase retarders is respectively controlled through two conductive layers disposed at the two quartz glass substrates by an electric field control mode.

Based on the above, by the at least three phase retarders having the liquid crystal cell sequentially arranged to form the tunable terahertz achromatic wave plate, and combining with the tuning device to control the liquid crystal orientation angle of the phase retarders by the magnetic field control mode or the electric field control mode, the phase retarders of the invention is applicable to the achromatic aberration in the terahertz frequency band, and provide the function of tuning the achromatic range.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

A plurality of embodiments is provided below to describe the invention, though the invention is not limited to the provided embodiments, and the embodiments can also be suitably combined. A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means.

Moreover, to specify the configuration relationship of the tunable terahertz achromatic wave plate of the embodiment, the tunable terahertz achromatic wave plate of the embodiment can be considered to be in the space constructed by a first direction D1, a second direction D2, and a third direction D3. The first direction D1 is substantially perpendicular to the second direction D2, for example. The third direction D3 is substantially perpendicular to the first direction D1 and the second direction D2 simultaneously, for example.

Figure 1:
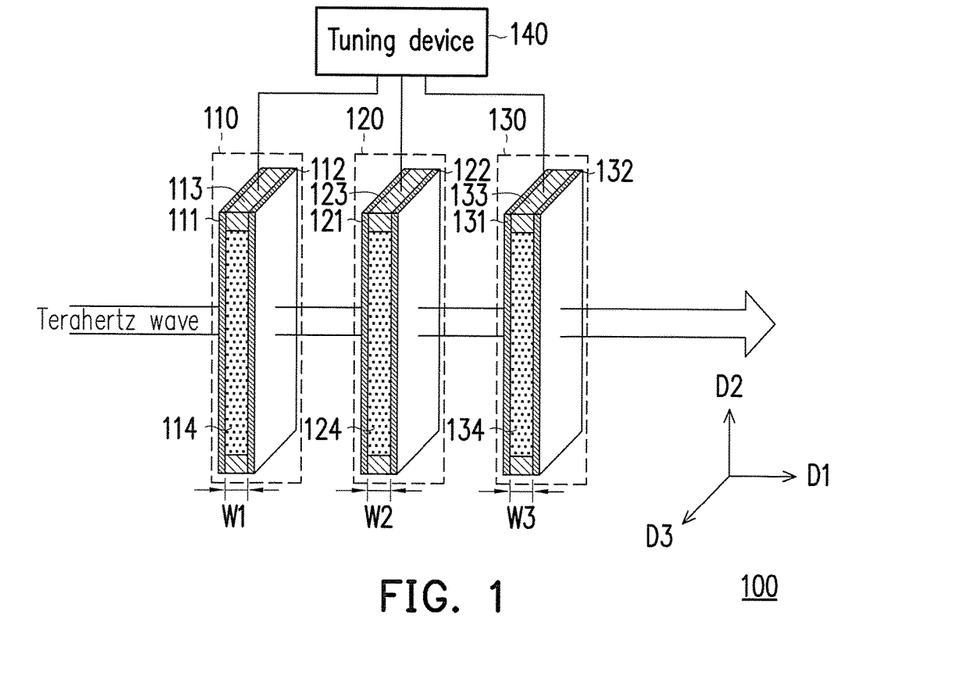
FIG. 1 is a schematic view illustrating a tunable terahertz achromatic wave plate according to an embodiment of the invention.

FIG. 1 is a schematic view illustrating a tunable terahertz achromatic wave plate according to an embodiment of the invention. Referring to FIG. 1, a tunable terahertz achromatic wave plate 100 is composed of three phase retarders 110, 120, and 130, wherein the phase retarders 110, 120, and 130 are arranged along the first direction D1 sequentially. In the embodiment, the phase retarders 110, 120, and 130 are configured to provide an achromatic range in a terahertz band, so as to reduce a chromatic aberration of a terahertz wave through the tunable terahertz achromatic wave plate 100 in the achromatic range.

In the embodiment, the phase retarders 110, 120, and 130 may be liquid crystal phase shifters. The phase retarders 110, 120, and 130 respectively includes a liquid crystal cell, and the liquid crystal cell of the phase retarders 110, 120, and 130 is composed of two quartz glass substrates and a spacer. Specifically, the phase retarder 110 includes two quartz glass substrates 111 and 112, and a spacer 113. The phase retarder 120 includes two quartz glass substrates 121 and 122, and a spacer 123. The phase retarder 130 includes two quartz glass substrates 131 and 132, and a spacer 133. In the embodiment, nematic liquid crystals (NLC) 114, 124, and 134 are further disposed between the two quartz glass substrates of each the liquid crystal cell of the phase retarders 110, 120, and 130. That is, the phase retarders 110, 120, and 130 of the embodiment are liquid crystal phase retarders, and the phase retarders 110, 120, and 130 respectively have a birefringence. Additionally, in the embodiment, thicknesses of the phase retarders 110, 120, and 130 are determined according to a size of the spacer between the two quartz glass substrates respectively. That is, phase differences provided by the phase retarders 110, 120, and 130 respectively are determined according to each of thicknesses W1, W2, and W3.

In the embodiment, the tunable terahertz achromatic wave plate 100 further includes a tuning device 140. The tuning device 140 is coupled with the phase retarders 110, 120, and 130 respectively, and configured to tune a liquid crystal orientation angle in the liquid crystal cell of the phase retarders 110, 120, and 130 respectively, so as to correspondingly change each birefringence of the phase retarders 110, 120, and 130 in the terahertz band. It should be noted that, the terahertz wave through the tunable terahertz achromatic wave plate 100 has the same phase retardation in the achromatic range. Also, in the embodiment, the achromatic range in the terahertz band is determined according to each the birefringence of the phase retarders 110, 120, and 130.

In the embodiment, for each of the phase retarders, the polarization phenomenon of each of the phase retarders can be represented by the following Jones matrix formula (1).

$$J_i(\delta_i, \theta_i) = \begin{bmatrix} \cos\frac{\delta_i}{2} + i\cos2\theta_i\sin\frac{\delta_i}{2} & i\sin2\theta_i\sin\frac{\delta_i}{2} \\ i\sin2\theta_i\sin\frac{\delta_i}{2} & \cos\frac{\delta_i}{2} - i\cos2\theta_i\sin\frac{\delta_i}{2} \end{bmatrix} \quad (1)$$

For the above formula (1), $\theta_i$ represents an included angle between a fast axis and an optical axis of a liquid crystal molecule of the phase retarder, and $\delta_i$ represents a phase difference caused by the phase retarder, wherein i is a positive integer greater than 0. Incidentally, in the embodiment, the thickness of each the phase retarder can be correspondingly tuned according to the design of $\theta_i$ and $\delta_i$.

For the tunable terahertz achromatic wave plate, the phase retardation generated by the tunable terahertz achromatic wave plate can be obtained by multiplying the Jones matrix of each of the phase retarders and calculating, as shown in the following formula (2) and formula (3).

$$J = \prod_i J_i = \begin{bmatrix} A & B \\ -B^* & A^* \end{bmatrix} \quad (2)$$

$$\tan^2 \frac{\delta}{2} = \frac{|\mathrm{Im}A|^2 + |\mathrm{Im}B|^2}{|\mathrm{Re}A|^2 + |\mathrm{Re}B|^2} \quad (3)$$

For the above formula (2) and formula (3), $\delta$ represents a phase difference caused by the tunable terahertz achromatic wave plate. Formula (2) can be used to represent the polarization phenomenon of a light wave passing through the tunable terahertz achromatic wave plate, and a phase difference $\delta$ of the tunable terahertz achromatic wave plate can be obtained by formula (3).

In the embodiment, for each of the phase retarders, an included angle between the liquid crystal molecule of the phase retarder and the polarization direction of incident light is $\varphi$. Thus, a liquid crystal orientation angle is $\varphi$. When the liquid crystal orientation angle $\varphi$ is changed, a corresponding equivalent birefringence will be changed accordingly. The phase retardation caused by the terahertz wave through the phase retarder can be calculated to obtain by the following formula (4).

$$\delta_i(\varphi) = \int_0^d \frac{2\pi f}{c} \Delta n_i(\varphi, z) dz \quad (4)$$

For the above formula (4), c is the speed of light in vacuum. f is an incident light wave frequency. $\Delta n_i$ is an equivalent birefringence of the liquid crystal orientation angle after changing. d can correspond to thicknesses W1, W2, and W3 of a liquid crystal layer of the phase retarder. z represents a variation of the first direction D1. In the embodiment, the tuning device 140 can tune the liquid crystal orientation angle of the phase retarders 110, 120, and 130 by the electric field control mode or the magnetic field control mode. When the applied magnetic field or electric field is large enough that the directions of the liquid crystal molecule and the field are parallel, the phase retardation caused by the phase retarder can be rewritten as the following formula (5).

$$\delta_i(\varphi) = \frac{2\pi df}{c} \left\{ \left[ \frac{\cos^2 \varphi}{n_e^2} + \frac{\sin^2 \varphi}{n_o^2} \right]^{-\frac{1}{2}} - n_o \right\} \quad (5)$$

For the above formula (5), $n_o$ is an ordinary refractive index, and $n_e$ is an extraordinary refractive index, wherein the birefringence is a difference between $n_o$ and $n_e$. d can correspond to the thicknesses W1, W2, and W3 of the liquid crystal layer of the phase retarder. That is, the tunable terahertz achromatic wave plate 100 can calculate the phase retardation and the achromatic range in the terahertz frequency band according to the above formula (1) to formula (5).

Particularly, in the embodiment, the tunable terahertz achromatic wave plate 100 can be a ¼ wave plate, and the phase retarders 110, 120, and 130 can be respectively a ⅓ wave plate, a half-wave plate, and a ⅓ wave plate sequentially. Thus, the phase of the terahertz wave through the tunable terahertz achromatic wave plate 100 will be retarded to ¼ wavelength. In the embodiment, the tuning device 140 can use the magnetic field mode or the electric field mode to control the liquid crystal orientation angle in the liquid crystal cell of the phase retarders 110, 120, and 130. Since when the liquid crystal orientation angle is changed, each the birefringence of the phase retarders 110, 120, and 130 is changed accordingly. Also, the achromatic range in the terahertz band is changed with each the birefringence of the phase retarders 110, 120, and 130.

That is, the users can choose the thicknesses of the phase retarders 110, 120, and 130, and the birefringence of the liquid crystal molecule to determine the phase retardation of the phase retarders 110, 120, and 130, such that the phase retardation of the terahertz wave incident to the tunable terahertz achromatic wave plate 100 can be maintained in ¼ wavelength in the achromatic range. Also, the users can respectively tune the liquid crystal orientation angle of the phase retarders 110, 120, and 130 through the tuning device 140, so as to correspondingly tune the achromatic range. However, the phase retarders 110, 120, and 130 are not limited to the above-mentioned wave plate type and order. Also, in an embodiment, the phase retardation respectively provided by the phase retarders 110, 120, and 130 can be determined according to the needs of the users. The specific descriptions of the magnetic field control mode and the electric field control mode are as follows.

Figure 2:
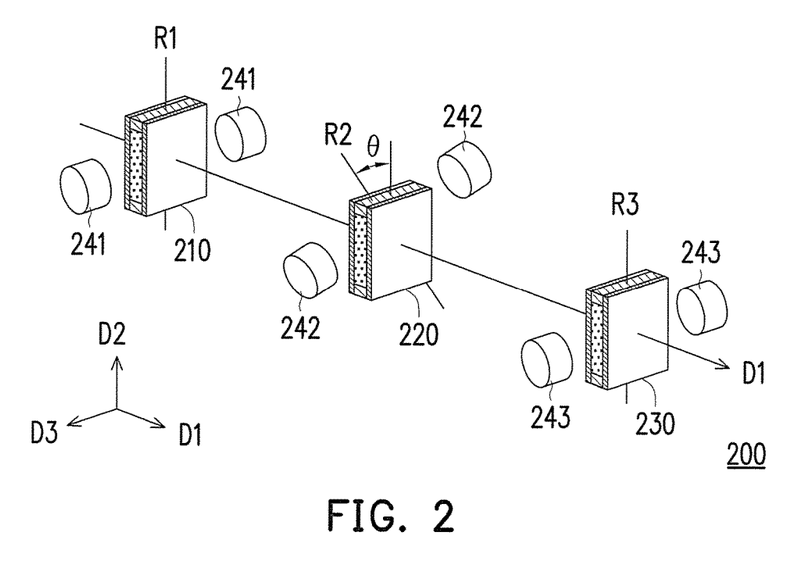
FIG. 2 is a schematic view illustrating a magnetic field control according to an embodiment of the invention.

FIG. 2 is a schematic view illustrating a magnetic field control according to an embodiment of the invention. Referring to FIG. 2, a tunable terahertz achromatic wave plate 200 includes three phase retarders 210, 220, and 230 sequentially arranged, and magnetic elements 241, 242, and 243 are disposed corresponding to the phase retarders 210, 220, and 230 respectively. That is, in the embodiment, the tuning device can respectively control the liquid crystal orientation angle of the phase retarders 210, 220, and 230 through the magnetic elements 241, 242, and 243 respectively disposed around the liquid crystal cell of the phase retarders 210, 220, and 230 by the magnetic field control mode. In the embodiment, the magnetic elements 241, 242, and 243 may be a set of rotatable permanent magnet pair respectively, and respectively disposed at two sides of the phase retarders 210, 220, and 230 symmetrically.

In the embodiment, the phase retarders 210, 220, and 230 are liquid crystal cells having vertical alignment. Two quartz glass substrates of the phase retarders 210, 220, and 230 can be plated with a silane solution (DMOAP) in a fixed ratio to form a silane thin film, such that the two quartz glass substrates are for vertical alignment. Thus, a long axis of the liquid crystal molecule between the two quartz glass substrates is perpendicular to a surface of the two quartz glass substrates, so as to be the liquid crystal molecule arranged in a vertical direction.

Figure 3:
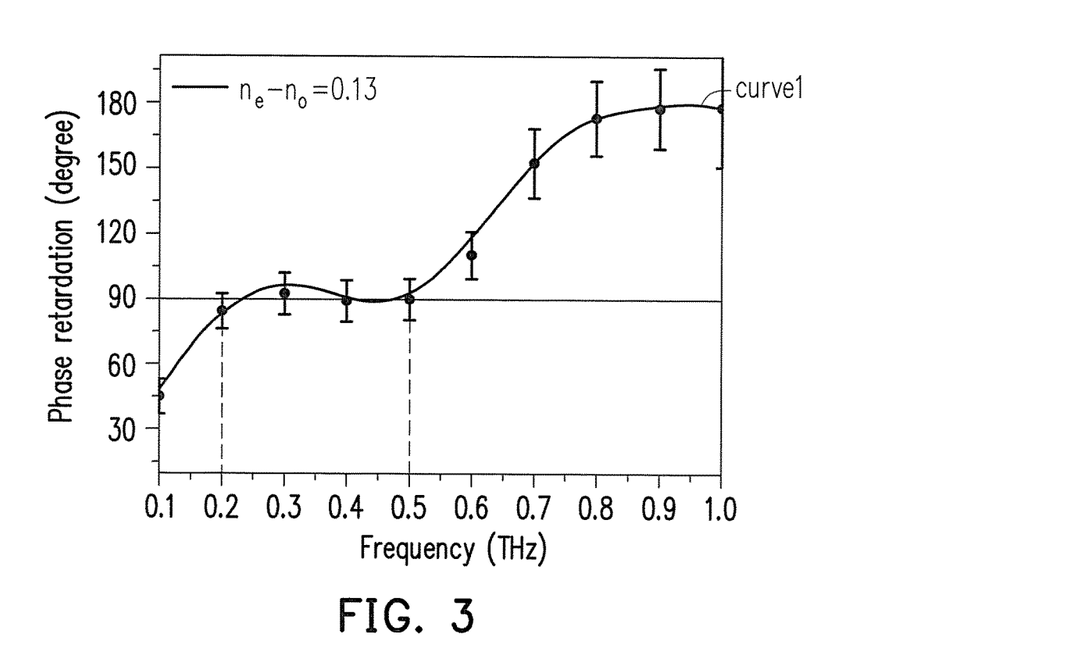
FIG. 3 is a schematic view illustrating an achromatic range in the terahertz band of the embodiment of FIG. 2.
Figure 4:
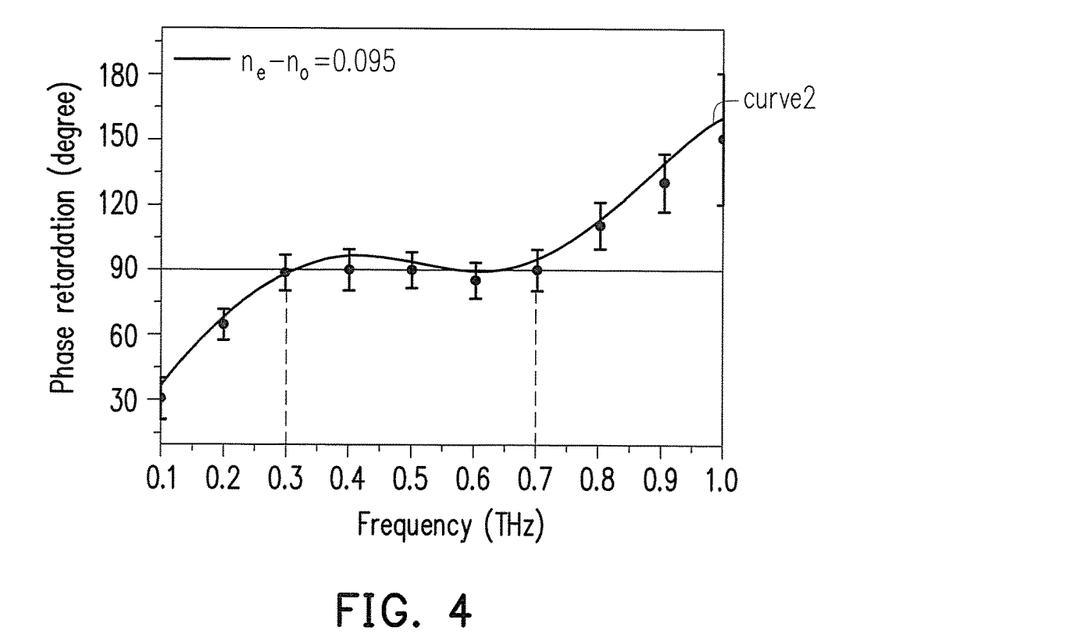
FIG. 4 is a schematic view illustrating an achromatic range in the terahertz band of the embodiment of FIG. 2 after tuning.

For example, the thicknesses of the phase retarders 210, 220, and 230 can be designed as 2.56 micrometers, 3.86 micrometers, and 2.56 micrometers respectively, and rotation axes R1, R2, and R3 of the magnetic elements 241, 242, and 243 can be respectively disposed to have an included angle θ relative to the second direction being 0 degree, 20 degrees, and 0 degree sequentially. In the embodiment, the tuning device can rotate the magnetic elements 241, 242, and 243 to control the magnetic field, such that two sets of data that the liquid crystal orientation angles are 0 degree and 30 degrees respectively correspond to the birefringences of the liquid crystal molecule which are 0.13 and 0.095. FIG. 3 is a schematic view illustrating an achromatic range in the terahertz band of the embodiment of FIG. 2. Referring to FIG. 2 and FIG. 3, a curve curve1 represents the results of phase retardation in the terahertz frequency band. When the liquid crystal orientation angle is 0 degree, and the frequency range is 0.2 to 0.5 Thz, the phase retardation is 90 degrees. FIG. 4 is a schematic view illustrating an achromatic range in the terahertz band of the embodiment of FIG. 2 after tuning. Referring to FIG. 2 and FIG. 4, a curve curve2 represents the results of phase retardation in the terahertz frequency band after tuning the liquid crystal orientation angle. When the liquid crystal orientation angle is 30 degrees, and the frequency range is 0.3 to 0.7 Thz, the phase retardation is 90 degrees. That is, the achromatic range caused by the tunable terahertz achromatic wave plate 200 can be shifted from 0.2 to 0.5 Thz to 0.3 to 0.7 Thz by magnetic field controlling the birefringence of the phase retarders 210, 220, and 230.

Additionally, since enough instructions, recommendations, and embodied illustrations for the related embodied features of the magnetic field control mode to tune the liquid crystal orientation angle of the embodiment may be learned from the common general knowledge in the field, detailed description thereof is not repeated.

Figure 5:
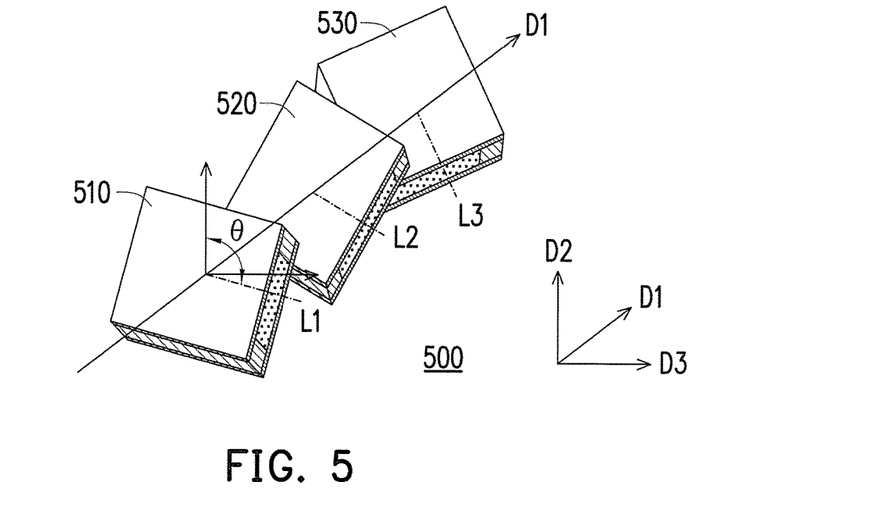
FIG. 5 is a schematic view illustrating an electric field control according to an embodiment of the invention.

FIG. 5 is a schematic view illustrating an electric field control according to an embodiment of the invention. Referring to FIG. 5, a tunable terahertz achromatic wave plate 500 includes three phase retarders 510, 520, and 530 sequentially arranged, and the phase retarders 510, 520, and 530 are respectively plated with indium tin oxide (ITO) thin films on each of the two quartz glass substrates respectively for parallel alignment. Thus, a long axis of the liquid crystal molecule between the two quartz glass substrates of the phase retarders 510, 520, and 530 is parallel to a surface of the two quartz glass substrates, so as to be the liquid crystal molecule arranged in a parallel direction. That is, in the embodiment, the tuning device can respectively control the liquid crystal orientation angle of the phase retarders 510, 520, and 530 through transparent conductive films respectively disposed at each of the two quartz glass substrates of the phase retarders 510, 520, and 530 by the electric field control mode.

Figure 6:
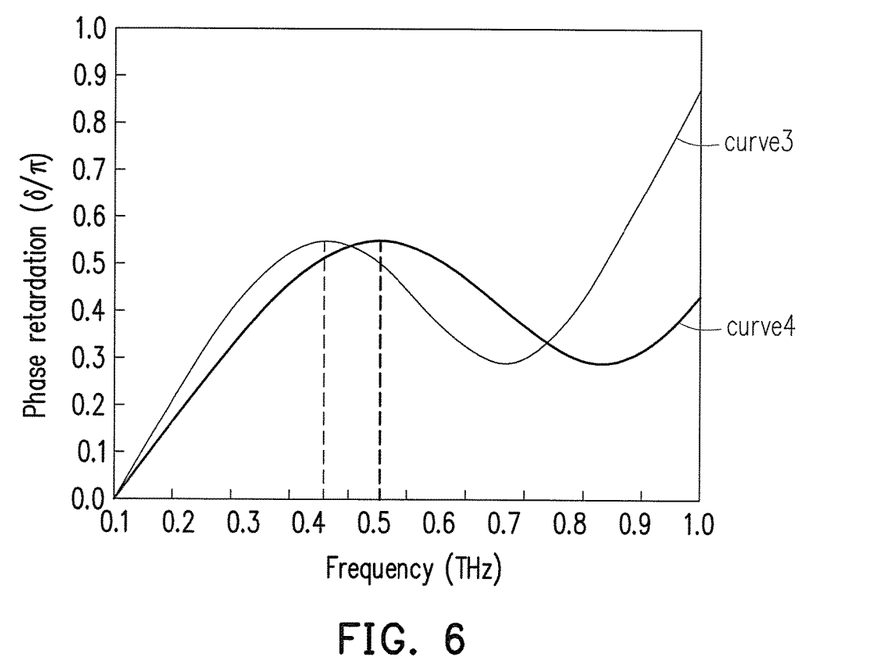
FIG. 6 is a schematic view illustrating an achromatic range in the terahertz band of the embodiment of FIG. 5.

For example, the thicknesses of the phase retarders 510, 520, and 530 can be designed as 0.8 micrometers, 1 micrometer, and 0.8 micrometers, and each rotation angles θ of the phase retarders 510, 520, and 530 respectively based on optical axes L1, L2, and L3 of the liquid crystal molecule is 105 degrees, 120 degrees, and 155 degrees sequentially. In the embodiment, the tuning device can make the liquid crystal orientation angle change by the electric field control mode. FIG. 6 is a schematic view illustrating an achromatic range in the terahertz band of the embodiment of FIG. 5. Referring to FIG. 5 and FIG. 6, curves curve3 and curve4 respectively represent the results of phase retardation of different liquid crystal orientation angles in the terahertz frequency band. In the same way as the above embodiment of the electromagnetic control. The tunable terahertz achromatic wave plate 500 can tune the liquid crystal orientation angle by the electric field control mode, so as to achieve the function of tuning the achromatic range in the terahertz frequency band.

Additionally, since enough instructions, recommendations, and embodied illustrations for the related embodied features of the electric field control mode to tune the liquid crystal orientation angle of the embodiment may be learned from the common general knowledge in the field, detailed description thereof is not repeated.

Figure 7:
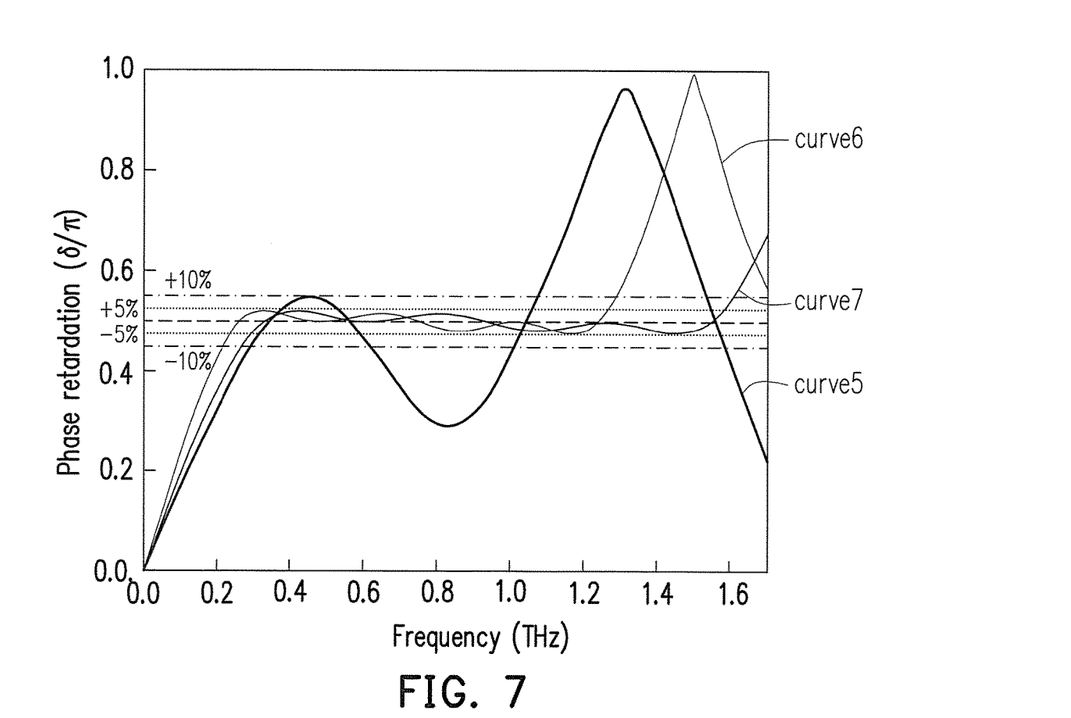
FIG. 7 is a schematic view illustrating an achromatic range in the terahertz band according to another embodiment of the invention.

However, the number of the phase retarders of the tunable terahertz achromatic wave plate is not limited to the three phase retarders in the above each embodiment. In other embodiments of the invention, the tunable terahertz achromatic wave plate may include at least three phase retarders. Referring to FIG. 7, FIG. 7 is a schematic view illustrating an achromatic range in the terahertz band according to another embodiment of the invention. A curve curve5 represents the results of the phase retardation of the three phase retarders in the terahertz frequency band. Curves curve6 and curve7 respectively represent the results of two phase retardations of four phase retarders in the terahertz frequency band. In the embodiment, the number, the thickness, and the liquid crystal orientation angle of the phase retarders of the tunable terahertz achromatic wave plate can be set according to the parameters in Table 1.

TABLE 1

| Curve | | Phase retarder | | | |
|---|---|---|---|---|---|
| | | $1^{st}$ | $2^{nd}$ | $3^{rd}$ | $4^{th}$ |
| curve5 | Thickness (um) | 900 | 600 | 600 | |
| | Liquid crystal orientation angle (°) | 105 | 120 | 155 | |
| curve6 | Thickness (um) | 500 | 1000 | 1000 | 1000 |
| | Liquid crystal orientation angle (°) | 36 | 162 | 0 | 54 |
| curve7 | Thickness (um) | 400 | 800 | 800 | 800 |
| | Liquid crystal orientation angle (°) | 36 | 162 | 0 | 54 |

In the embodiment, although the increase in the number of the phase retarders will affect the limitation of penetration rate, it can provide a better result of phase retardation. According to Table 1 and FIG. 7, both the results of phase retardation of the curves curve6 and curve7 of FIG. 7 in the terahertz frequency band respectively are better than the result of phase retardation of the curve curve5 in the terahertz frequency band, and the achromatic ranges of the curves curve6 and curve7 are flatter than the achromatic range of the curve curve5. That is, the tunable terahertz achromatic wave plate may be composed of three or more phase retarders.

In the embodiment, the number of the phase retarders of the tunable terahertz achromatic wave plate may be determined by calculating the pathway of multiple phase retarders on Poincare sphere. Also, the more phase retarders can achieve better achromatic performance. In other words, the more phase retarders have wider achromatic range, and the curve thereof is smoother. In the design, first, the designer can use the sum of differences between the phase difference and 90 degrees under different frequency (least square method) as an object function, and calculate the best thickness and liquid crystal orientation angle of the three and four phase retarders under different frequency ranges respectively. Then, the designer can simulate the corresponding relationship between the phase difference and frequency according to the thickness and the liquid crystal orientation angle of the phase retarders, so as to obtain the result of achromatic aberration as FIG. 7.

Figure 8:
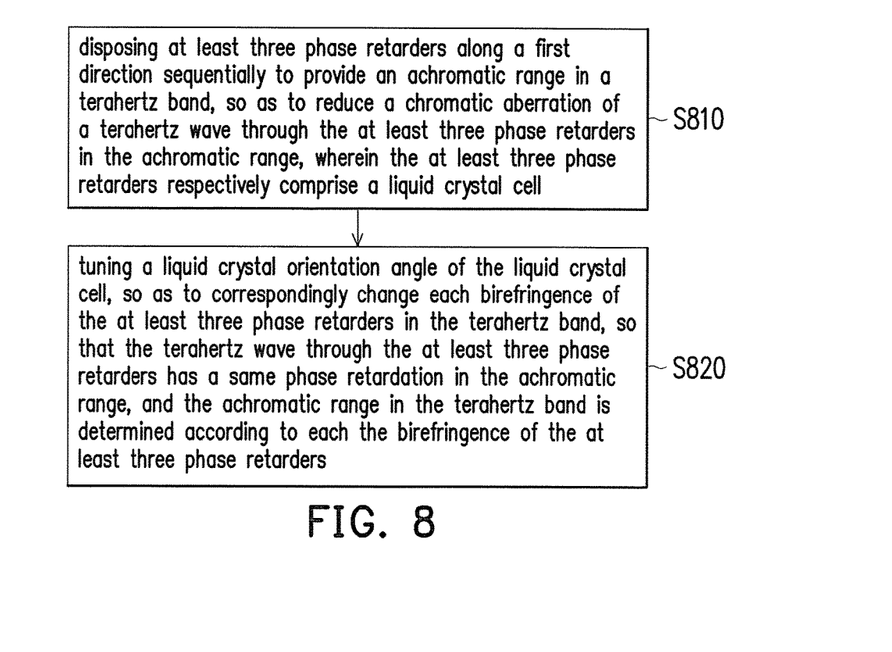
FIG. 8 is a flow chart illustrating a terahertz achromatic range tuning method according to an embodiment of the invention.

FIG. 8 is a flow chart illustrating a terahertz achromatic range tuning method according to an embodiment of the invention. Referring to FIG. 1 and FIG. 8, the terahertz achromatic range tuning method of the embodiment is applied to at least the tunable terahertz achromatic wave plate of FIG. 1. In Step S810, the at least three phase retarders 110, 120, and 130 are disposed along the first direction sequentially to provide the achromatic range in the terahertz band, so as to reduce the chromatic aberration of the terahertz wave through the at least three phase retarders 110, 120, and 130 in the achromatic range, wherein the at least three phase retarders 110, 120, and 130 respectively include the liquid crystal cell. In Step S820, the liquid crystal orientation angle of the liquid crystal cell is tuned, so as to correspondingly change each birefringence of the at least three phase retarders 110, 120, and 130 in the terahertz band, such that the terahertz wave through the at least three phase retarders 110, 120, and 130 has the same phase retardation in the achromatic range, and the achromatic range in the terahertz band is determined according to each the birefringence of the at least three phase retarders 110, 120, and 130. Additionally, since enough instructions, recommendations, and embodied illustrations for the terahertz achromatic range tuning method of the embodiment may be learned from the description of the embodiments from FIG. 1 to FIG. 7, detailed description thereof is not repeated.

In summary, in the embodiments of the invention, the tunable terahertz achromatic wave plate can reduce the chromatic aberration of the terahertz wave through the tunable terahertz achromatic wave plate in the achromatic range by the composition of the three phase retarders. The tunable terahertz achromatic wave plate of the invention can control the liquid crystal orientation angle of the phase retarders by the electric field control mode or the magnetic field control mode, such that the birefringence of the phase retarder is changed correspondingly, thereby achieving the function of tuning the achromatic range.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A tunable terahertz achromatic wave plate, comprising:
   at least three phase retarders, comprises a first phase retarder, a second phase retarder, and a third phase retarder, and the first phase retarder, the second phase retarder, and the third phase retarder are a ⅓ wave plate, a half-wave plate, and another ⅓ wave plate arranged along a first direction sequentially, and configured to provide an achromatic range in a terahertz band, so as to reduce a chromatic aberration of a terahertz wave through the tunable terahertz achromatic wave plate in the achromatic range, wherein the at least three phase retarders respectively comprise a liquid crystal cell; and
   a tuning device, configured to tune a liquid crystal orientation angle of the liquid crystal cell, so as to correspondingly change each birefringence of the at least three phase retarders in the terahertz band,
   wherein the terahertz wave through the tunable terahertz achromatic wave plate has a same phase retardation of ¼ wavelength in the achromatic range, and the achromatic range in the terahertz band is determined according to each the birefringence of the at least three phase retarders.

2. The tunable terahertz achromatic wave plate according to claim 1, wherein the liquid crystal cell comprises two quartz glass substrates, a thickness of the liquid crystal cell is determined according to a size of a spacer between the two quartz glass substrates, and the two quartz glass substrates further comprise a nematic liquid crystal therebetween,
   wherein each phase difference of the at least three phase retarders is determined according to the thickness of each the liquid crystal cell.

3. The tunable terahertz achromatic wave plate according to claim 2, wherein the liquid crystal cell is a liquid crystal cell having vertical alignment, and the tuning device respectively controls a liquid crystal orientation angle of the at least three phase retarders through a magnetic element disposed around the liquid crystal cell by a magnetic field control mode.

4. The tunable terahertz achromatic wave plate according to claim 3, wherein the two quartz glass substrates are respectively plated with silane thin films for vertical alignment.

5. The tunable terahertz achromatic wave plate according to claim 3, wherein thicknesses of the first phase retarder, the second phase retarder, and the third phase retarder are 3.86 micrometers, 2.56 micrometers, and 3.86 micrometers sequentially.

6. The tunable terahertz achromatic wave plate according to claim 2, wherein the liquid crystal cell is a liquid crystal cell having parallel alignment, and the tuning device respectively controls a liquid crystal orientation angle of the at least three phase retarders through two conductive layers disposed at the two quartz glass substrates by an electric field control mode.

7. The tunable terahertz achromatic wave plate according to claim 6, wherein the two quartz glass substrates are respectively plated with indium tin oxide thin films for parallel alignment.

8. The tunable terahertz achromatic wave plate according to claim 6, wherein thicknesses of the first phase retarder, the second phase retarder, and the third phase retarder are 0.8 micrometers, 1 micrometer, and 0.8 micrometers sequentially.

* * * * *